J. F. NEWMAN.
HOE.
APPLICATION FILED JUNE 21, 1920.
1,388,191. Patented Aug. 23, 1921.
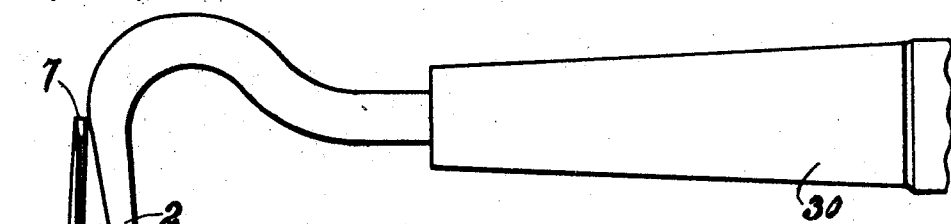
Fig. 1.
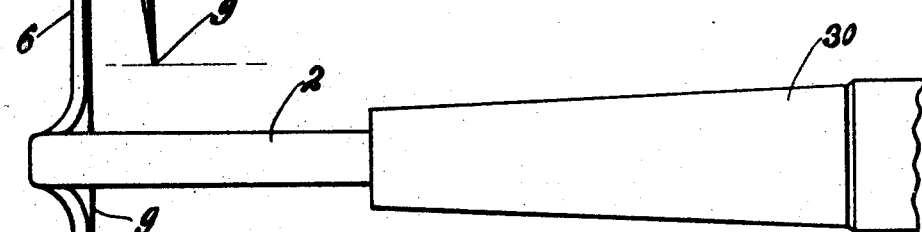
Fig. 2.
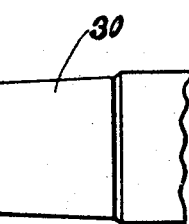
Fig. 3.
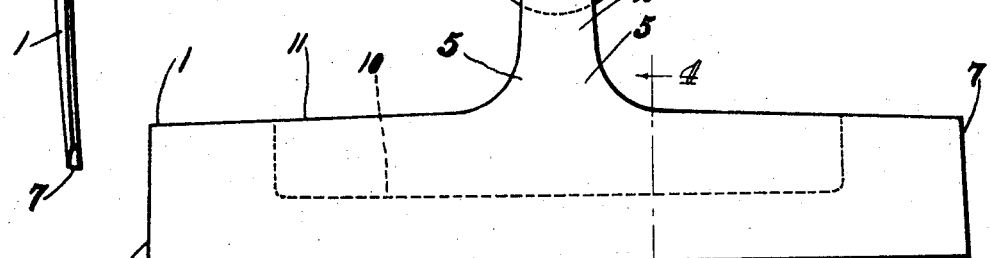
Fig. 4.
Witness 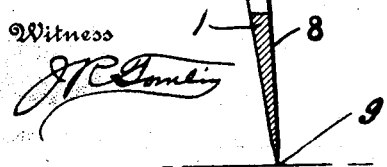
Inventor
J. F. Newman
By C. A. Snow & Co.
Attorneys

UNITED STATES PATENT OFFICE.

JOHN F. NEWMAN, OF KANSAS CITY, MISSOURI.

HOE.

1,388,191.  Specification of Letters Patent.  Patented Aug. 23, 1921.

Application filed June 21, 1920. Serial No. 390,495.

*To all whom it may concern:*

Be it known that I, JOHN F. NEWMAN, a citizen of the United States, residing at Kansas City, in the county of Jackson and State of Missouri, have invented a new and useful Hoe, of which the following is a specification.

The device forming the subject matter of this application is a hoe, and the invention aims to provide a hoe which will scour itself readily, the blade of the hoe being sharpened along its lower edge and at its ends, the construction being such that the blade may be sharpened as aforesaid, without rendering unduly brittle, the connection between the blade of the hoe and the shank thereof.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a hoe constructed in accordance with the invention; Fig. 2 is a top plan; Fig. 3 is an end elevation; and Fig. 4 is a section taken approximately on the line 4—4 of Fig. 3.

The hoe hereinafter claimed comprises a blade 1 which preferably is made of tool steel. The numeral 2 denotes a shank mounted in a handle 30, the shank 2 being formed integrally with the blade 1 and being located in direct alinement therewith. It is to be observed that the construction last above described is such that there are no projections on either the front surface of the blade 1 or on the rear surface thereof, as is the case when the shank 2 is overlapped on the blade and is secured thereto by riveting or otherwise. The advantage in having no projections on either the front or the rear surface of a hoe blade will be appreciated readily by any person who has used a tool of the kind alluded to. In order to provide a secure connection between the blade 1 and the shank 2, since the shank is not overlapped on the blade, the shank is increased in width, as indicated at 5, at the place where the shank is attached to the blade. The blade 1 tapers in thickness, as indicated at 6, from its central portion to its ends, to define terminal cutting edges 7. In cross section, the blade 1 is wedge-shaped as indicated at 8, to define a lower cutting edge 9. The blade 1 is tempered along its ends and in its lower portion, whereby the edges 7 and 9 will hold their sharpness. Within an area defined by the line 10 in Fig. 3 and by a portion of the upper edge 11 of the blade 1, the blade is not tempered. The blade, therefore is untempered at the place of juncture between the shank 2 and the blade. As a consequence, there is a mass of tough metal where the shank 2 joins the blade 1, and a fracture at this point will not be likely to occur. The blade 1 may have a slight longitudinal curvature, as shown at 12.

The hoe blade hereinbefore described will scour itself readily. The blade has a lower cutting edge, and end cutting edges, the blades being tempered so that these edges will remain sharp, the connection between the blade and the shank being, nevertheless, tough and possessing none of those brittle characteristics which mark a piece of tempered metal.

Having thus described the invention, what is claimed is:—

A hoe comprising a blade and a shank projecting from the blade in direct alinement therewith, the blade being in the form of a narrow strip of relatively small width measured longitudinally of the shank and being of relatively great length measured transversely of the shank, the shank being increased in width at the place where it joins the blade, the blade tapering in thickness from its central portion to its ends to define terminal cutting edges, and being wedge-shaped in cross section, to define a lower cutting edge, the blade being tapered along its ends and in its lower portion, whereby said edges will hold their sharpness, the blade embodying an untempered portion located at the place of juncture between the shank and the blade and extended well toward the ends of the blade to prevent a rupture at the place of juncture between the shank and the blade due to the strain produced by the relative length of the blade, said untempered portion offsetting any weakness resulting from the fact that the blade is narrow.

In testimony that I claim the foregoing as my own, I have hereto affixed my signature in the presence of two witnesses.

JOHN F. NEWMAN.

Witnesses:
CLIFF JAY,
R. S. PEABODY.